United States Patent [19]
Chang et al.

[11] Patent Number: 6,091,516
[45] Date of Patent: Jul. 18, 2000

[54] DEVICE FOR HOLDING AND MOVING A CONTACT IMAGE SENSOR

[75] Inventors: Yao-Wen Chang, Miaoli Hsien; Che-Yen Lin, Chungli, both of Taiwan

[73] Assignee: Umax Data Systems Inc., Hsinchu, Taiwan

[21] Appl. No.: 09/067,171

[22] Filed: Apr. 27, 1998

[30] Foreign Application Priority Data

Feb. 7, 1998 [TW] Taiwan .................................. 87201821

[51] Int. Cl.$^7$ ...................................................... H04N 1/40
[52] U.S. Cl. .......................................................... 358/474
[58] Field of Search .................................. 358/474, 496, 358/497, 475; 382/312

[56] References Cited

U.S. PATENT DOCUMENTS

| | | | |
|---|---|---|---|
| 4,831,457 | 5/1989 | Watanabe | 358/256 |
| 4,879,604 | 11/1989 | Koshiyouji | 358/474 |
| 5,119,212 | 6/1992 | Mori | 358/484 |
| 5,628,575 | 5/1997 | Morikawa | 400/693 |
| 5,814,809 | 9/1998 | Han | 250/208.1 |
| 5,898,508 | 4/1999 | Bekanich | 358/474 |
| 5,907,413 | 5/1999 | Han | 358/497 |
| 5,936,747 | 8/1999 | Lin et al. | 358/496 |

*Primary Examiner*—Jerome Grant, II
*Attorney, Agent, or Firm*—Harness, Dickey & Pierce, P.L.C.

[57] ABSTRACT

A contact image sensor is received and held in a holder slidably mounted on a rectangular lower frame and is disposed in parallel to the two short sides of the lower frame to pick up the image of a detection object placed on the transparent plate mounted on a rectangular upper frame. A rod-like guiding member having two ends respectively mounted on the center of the two short sides of the lower frame, disposed orthogonal to the longitudinal holder, for guiding the movement of the holder is provided. A connecting member slidably mounted on the guiding member and detachably connected to the holder near the center thereof is provided. A biasing member for biasing the holder upwardly, disposed between the connecting member and the holder is also provided.

14 Claims, 7 Drawing Sheets

DEVICE FOR HOLDING AND MOVING A CONTACT IMAGE SENSOR

FIELD OF THE INVENTION

The present invention relates to an optical scanner using a contact image sensor, and in particular to a device for holding and moving a rod-like contact image sensor.

DESCRIPTION OF THE PRIOR ART

Referring to FIG. 1 and FIG. 2, a top view and a side sectional view of an optical scanner of Taiwan Patent No. 322,182 are respectively shown. The optical scanner 10 includes a rectangular scanner cover 11, a rectangular upper frame 12 having a glass plate 13 mounted thereon, an opto-mechanical system 14, a rectangular base 15 and a driving mechanism 16. The driving mechanism 16 consists of a drive motor 162, a control interface 161, pulley 163, 163' and a transmission string 164 wrapped on the pulley 163, 163'. The opto-mechanical system 14 includes a rod-like contact image sensor (hereinafter referred to as CIS) 141, a holder 20 for receiving and holding the CIS 141 and a biasing member 31. The holder 20 is cartridge-shaped and bridges on the two long sides of the rectangular base 15. The holder 20 has two circular holes 21, 21' formed at the lower side and near the center thereof, through which a guiding rod 163 passes. The guiding rod 163 is disposed at the center of the rectangular base 15 along its longitudinal axis 160 and is orthogonal to the cartridge-shaped holder 20, so that the holder 20 slides along the longitudinal axis 160 of the base 15 being guided by the guiding rod 163 when the holder 20 is driven by the driving mechanism 16. The biasing member 31 is a coil spring and is disposed between the bottom of the cartridge-shaped holder 20 and the CIS 141. Two friction plates 40,40', which are made of materials having very low friction force, are adhered to the top surface of the CIS 141 near the two ends thereof. In this way, when the holder 20 is driven to slide along the longitudinal axis 160 of the base 15, the CIS 11 is urged by the biasing member 31 upwardly and the two friction plates 40 are brought into contact with the reverse side of the glass plate 13. Thus the CIS 141 can be moved stably along the longitudinal axis 160 of the base 15.

However, as the biasing member 31 directly urges the CIS 141, the CIS 141 can not be kept in its original position in the holder 20 and becomes inclined and sometimes deformed. Also, the CIS 141 is a delicate element, and should be kept insulated. Direct contact with the biasing member 31 which is made of metal, reduces the insulation of the CIS 141. Inserting an insulation layer between the CIS 141 and the metal biasing member 31 inevitably increases the complexity of the structure.

Moreover, the flexible transmission element, that is, the transmission string 164 of the driving mechanism 16, is connected to the holder 20 at a position laterally slightly distant from the longitudinal axis 163. Thus when the holder 20 is driven to start moving, the holder 20 is caused to incline by the driving force of the driving mechanism 16. Accordingly, the precision of the CIS 141 is affected. Supporting the holder 20 with bearings can solve this problem, however, the structure of the driving mechanism becomes complicated.

For the foregoing reasons, there is a need for providing a holding and moving mechanism capable of moving a contact image sensor stably and horizontally along the longitudinal axis of the scanner without inclination and without causing damage to the insulation of the contact image sensor.

SUMMARY OF THE INVENTION

It is therefore an object of the invention to provide a holding and moving device of a contact image sensor that satisfies this need. The present invention also includes an optical scanner using the above holding and moving device.

According to the invention, the contact image sensor is received and held in a holder slidably mounted on a rectangular lower frame and being disposed in parallel to the two short sides of the lower frame to pick up the image of a detection object placed on the transparent plate mounted on a rectangular upper frame. A rod-like guiding member having two ends respectively mounted on the center of the two short sides of the lower frame, disposed orthogonal to the longitudinal holder, for guiding the moving of the holder is provided. A connecting member slidably mounted on the guiding member and detachably connected to the holder near the center thereof is provided. A biasing member for biasing the holder upwardly, disposed between the connecting member and the holder is also provided.

As the contact image sensor is received in the holder and the biasing member is disposed between the holder and the connecting member and does not directly urge the contact image sensor, the contact image sensor can be stably and horizontally received in the holder without inclination.

According to an aspect of the invention, the driving device of the invention includes a motor fixedly mounted on the lower frame, a transmission gear driven by the motor, a first drive pulley coupled to the transmission gear, being disposed near to one of the short sides of the lower frame, a second drive pulley disposed near to the other short side of the lower frame, and a toothed belt wrapped round the first pulley and the second pulley. The connecting member includes a laterally disposed engaging portion having a toothed surface for engaging with the toothed belt. Accordingly, even at the start of the driving, the holder can move along the longitudinal direction of the lower frame without inclination.

BRIEF DESCRIPTION OF THE DRAWINGS

The present invention can be more fully understood from the following detailed description and preferred embodiment with reference to the accompanying drawings in which.

DETAILED DESCRIPTION OF THE PREFERRED EMBODIMENTS OF THE INVENTION

Figure 1:
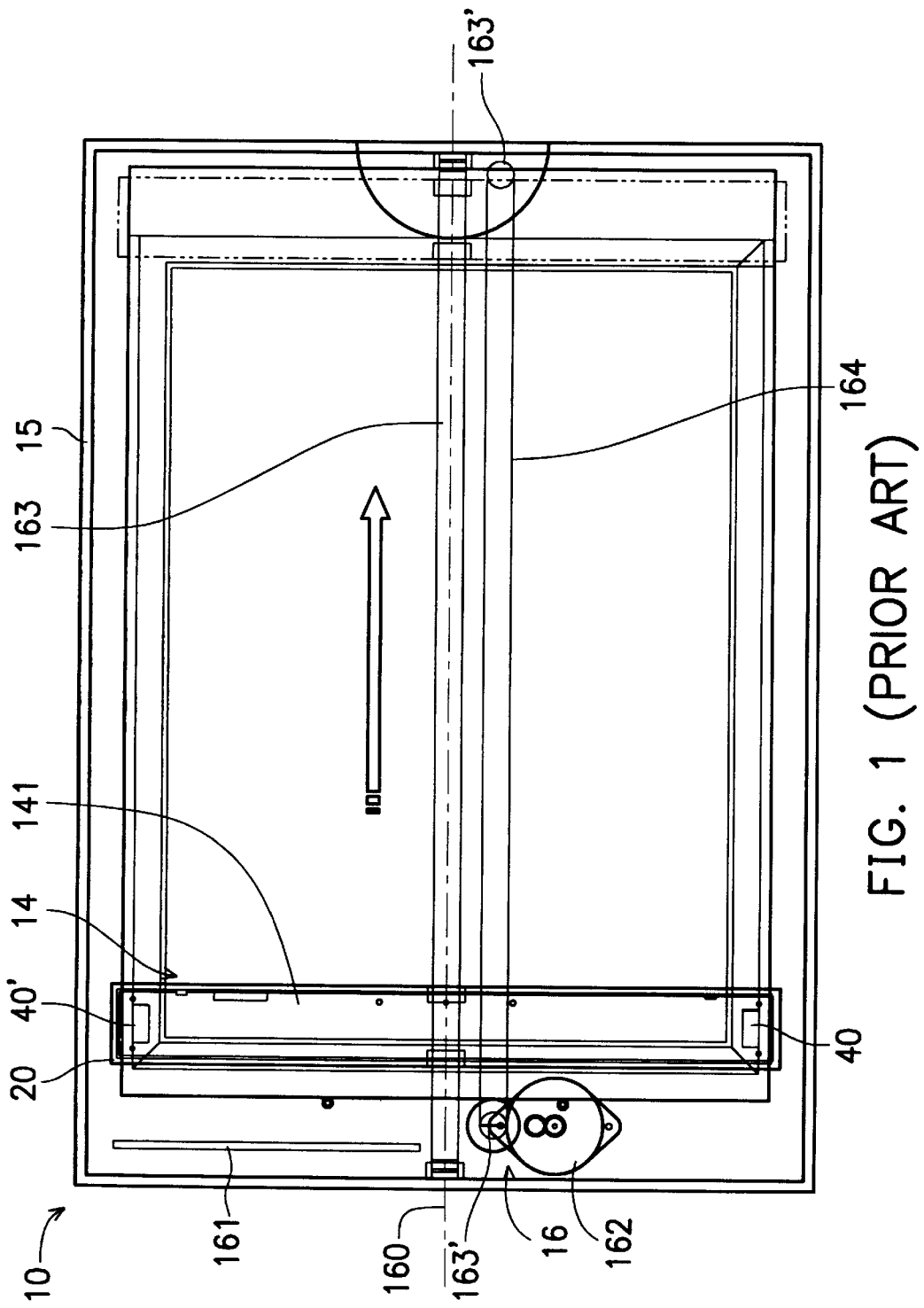
FIG. 1 is a top view of an optical scanner using a contact image sensor, disclosed in Taiwan patent No. 322,182.
Figure 2:
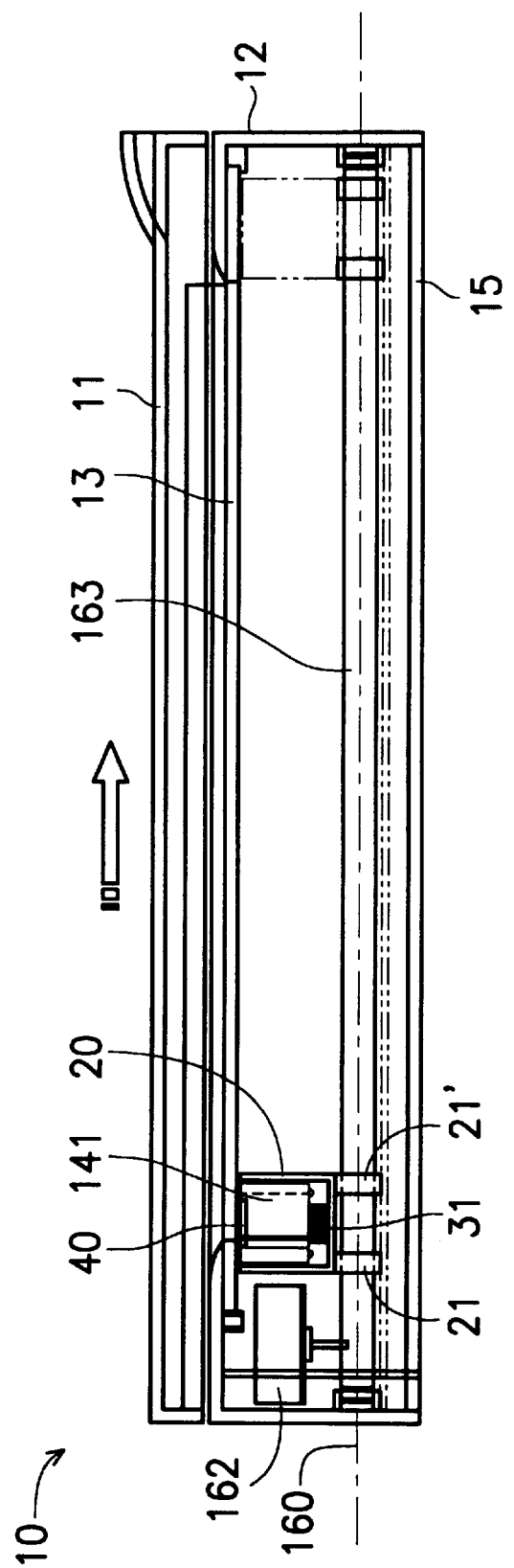
FIG. 2 is a schematic side-sectional view of the optical scanner of FIG. 1.
Figure 3:
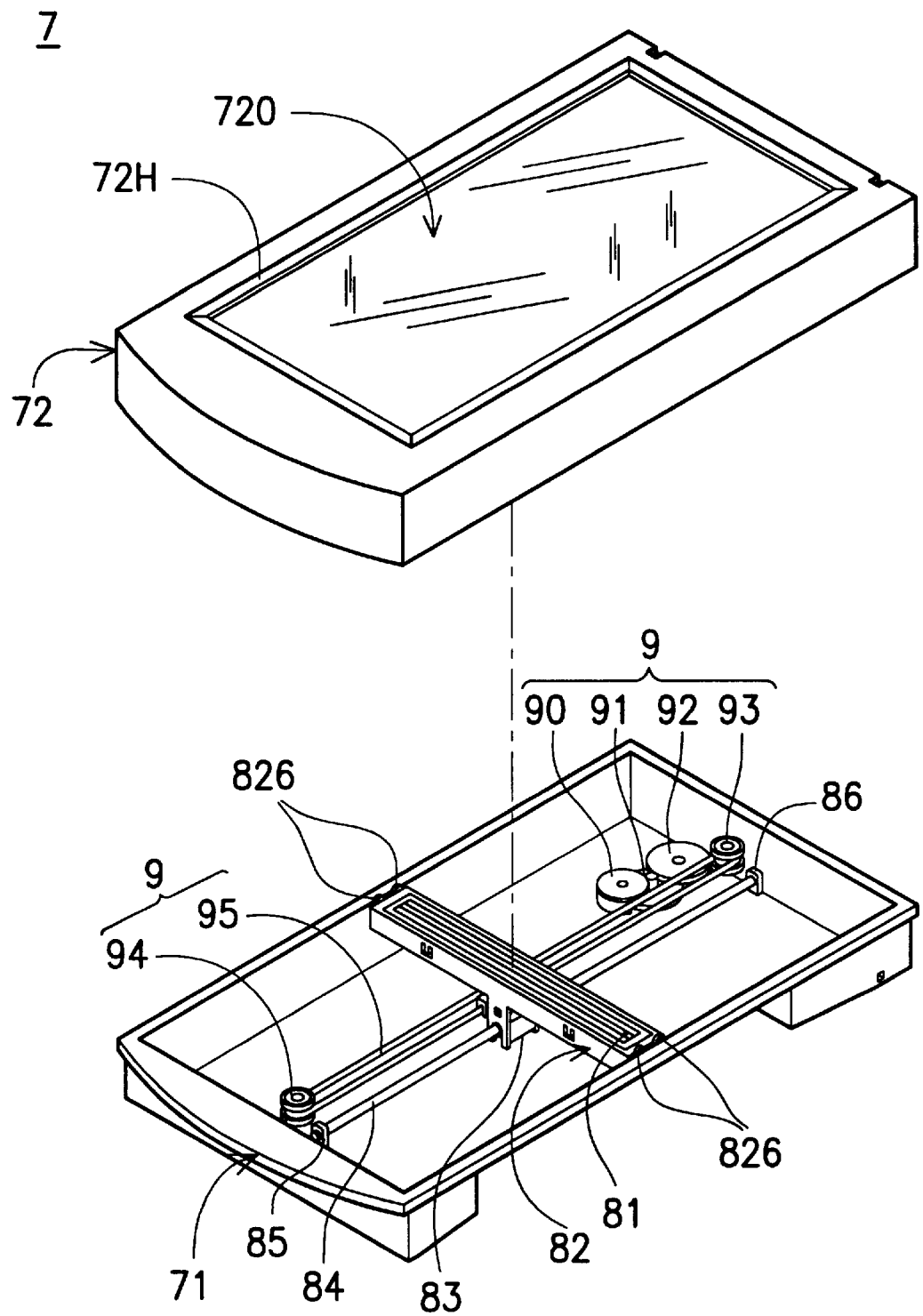
FIG. 3 is an exploded view of the optical scanner of a first preferred embodiment of the invention, showing the upper frame of the scanner separated from the lower frame.

Referring to FIG. 3, the upper frame 72 of the optical scanner of the first embodiment of the invention is substantially rectangular and has a rectangular opening 72H on which a glass plate 720 is mounted. A rectangular lower frame 71 having substantially the same size is used to secure to the upper frame 72 and functions as a base. A holder 82 is supported on the two long sides of the lower frame 71 in parallel to the two short sides of the lower frame 71 by two rollers 826, 826 which are respectively disposed at the two ends of the holder 82, so that the holder can freely slide along the longitudinal axis of the rectangular lower frame 71. A cartridge shaped contact image sensor 81 is received and held in the holder 82. The contact image sensor 81 picks up the image of a detection object, for example a document (not shown) placed on the glass plate 720. The holder 82 is guided by a guiding rod 84. The guiding rod 84 is made of metal and has two ends. The two ends are respectively mounted on two seats 85, 86 which are formed respectively near the center of the two short sides of the rectangular lower frame 71. The guiding rod 84 is thus disposed orthogonal to the holder 82. A driving means 9 is disposed parallel to the guiding rod 84 for driving the holder 82 to move along the longitudinal axis of the lower frame 71. The driving means 9 includes a motor 90 fixedly mounted on the lower frame 71, two transmission gears 91, 92 driven by the motor 90, a drive pulley 93 coupled to the transmission gears 91, 92, being disposed near to one of the short sides of the lower frame 71, a drive pulley 94 disposed near to the other short side of the lower frame 71 and a belt 95 wrapped round the pulley 93 and the pulley 94.

Figure 4:
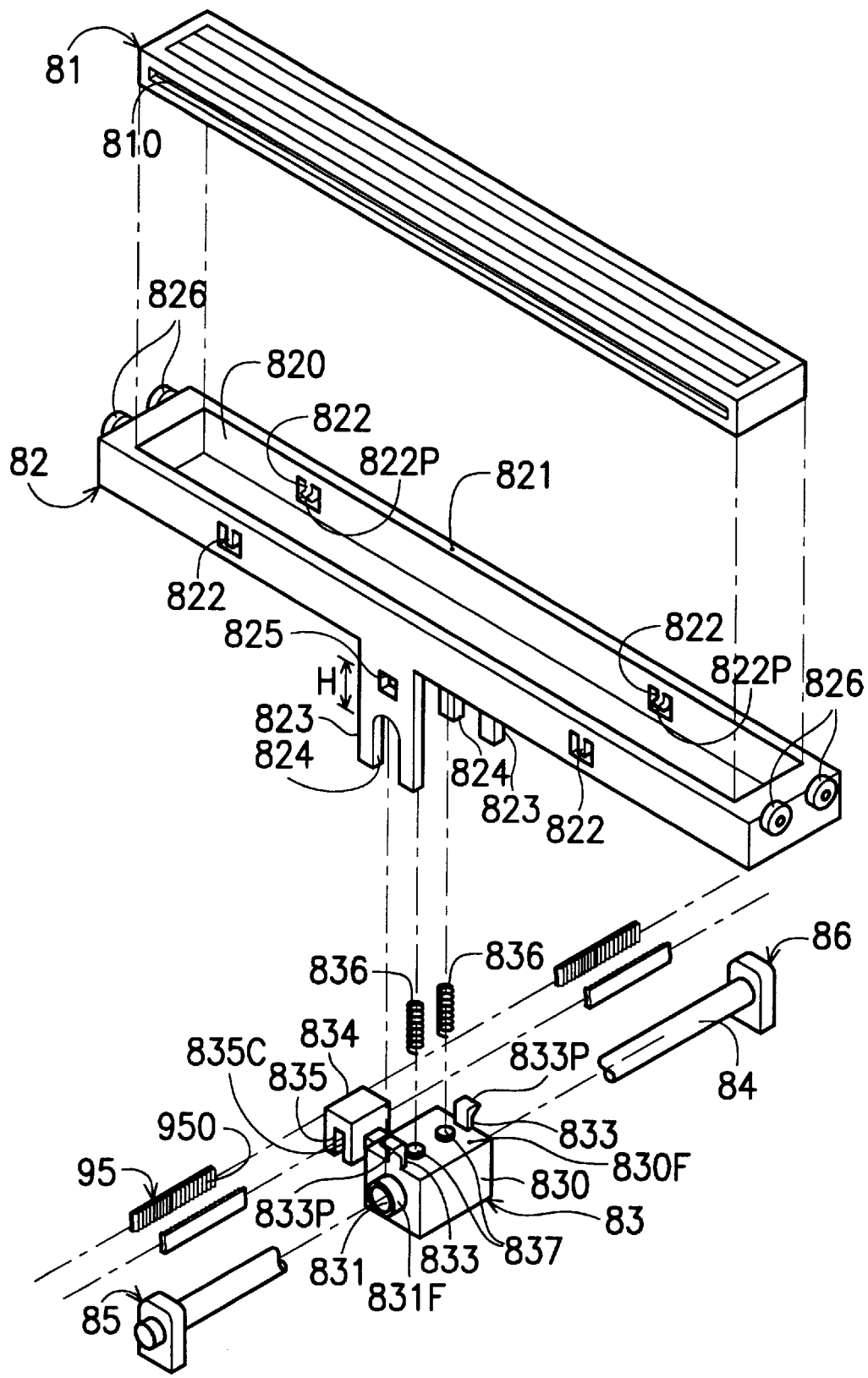
FIG. 4 is an exploded view showing the receiving and removing device of a contact image sensor of the first preferred embodiment of the invention.

Referring to FIG. 4, the contact image sensor 81 has two grooves 810 formed at the two sides thereof. The holder 82 has an elongate recessed portion 820 for receiving and holding the contact image sensor 81. At each of the two sidewalls of the holder 82, two engaging elements 822, 822 are formed. Each engaging element has an inwardly protruded portion 822P. When the cartridge shaped contact image sensor 81 is horizontally received in the elongate recessed portion 820, the protruded portions 822P are protruded in the corresponding grooves 810, 810 so that the contact image sensor 82 can be firmly received in the holder 81 without inclination.

The elongate holder 82 also includes a pair of opposite protruded plates 823, 823 extended downwardly from the two sidewalls thereof. The two downwardly protruded plates 823, 823 are disposed at the center of the holder 82. Each of the two protruded plates 823, 823 has a hole 825 and a U-shaped cut 824. As shown in FIG. 4, the hole 825 is formed at a position higher than the U-shaped cut 824 with a distance H.

Referring again to FIG. 4, a connecting member 83 is slidably mounted on the guiding rod 84. The connecting member 83 is a rectangular block made of plastic. Two upwardly protruded engaging members 833, 833 are formed at the top surface 830F of the rectangular block. Each of the two upwardly protruded engaging members 833, 833 has an outwardly protruded portion 833P for being detachably engaged in the hole 825 of the protruded plate 823 of the holder 82. The connecting member 83 has a through hole formed along the longitudinal axis thereof so that two openings 831, 832 are respectively formed at the end surface of the rectangular connecting member 83. The guiding rod 84 passes the through hole in a manner the connecting member 83 can be slid along the guiding rod 84 freely. Two laterally protruded ring-shaped flanges 831F, 832F are respectively formed surrounding the openings 831, 832. The two laterally protruded ring-shaped flanges 831F, 831F are received in the U-shaped cut 824 when the protruded portion 833 is engaged in the hole 825. The connecting member 83 also includes two posts 837, 837 formed at the top surface 830F thereof. The two posts 837, 837 function as seats of the two coils springs 836, 836. At one of the sidewalls adjacent to the driving means 9, an engaging portion 834 is laterally disposed. The engaging portion 834 has an engaging region 835 which is substantially an upwardly formed groove having a toothed inner wall 835C. The toothed inner wall 835C can be engaged with the toothed portion 950 of the belt 95.

Figures 5A, 5B:
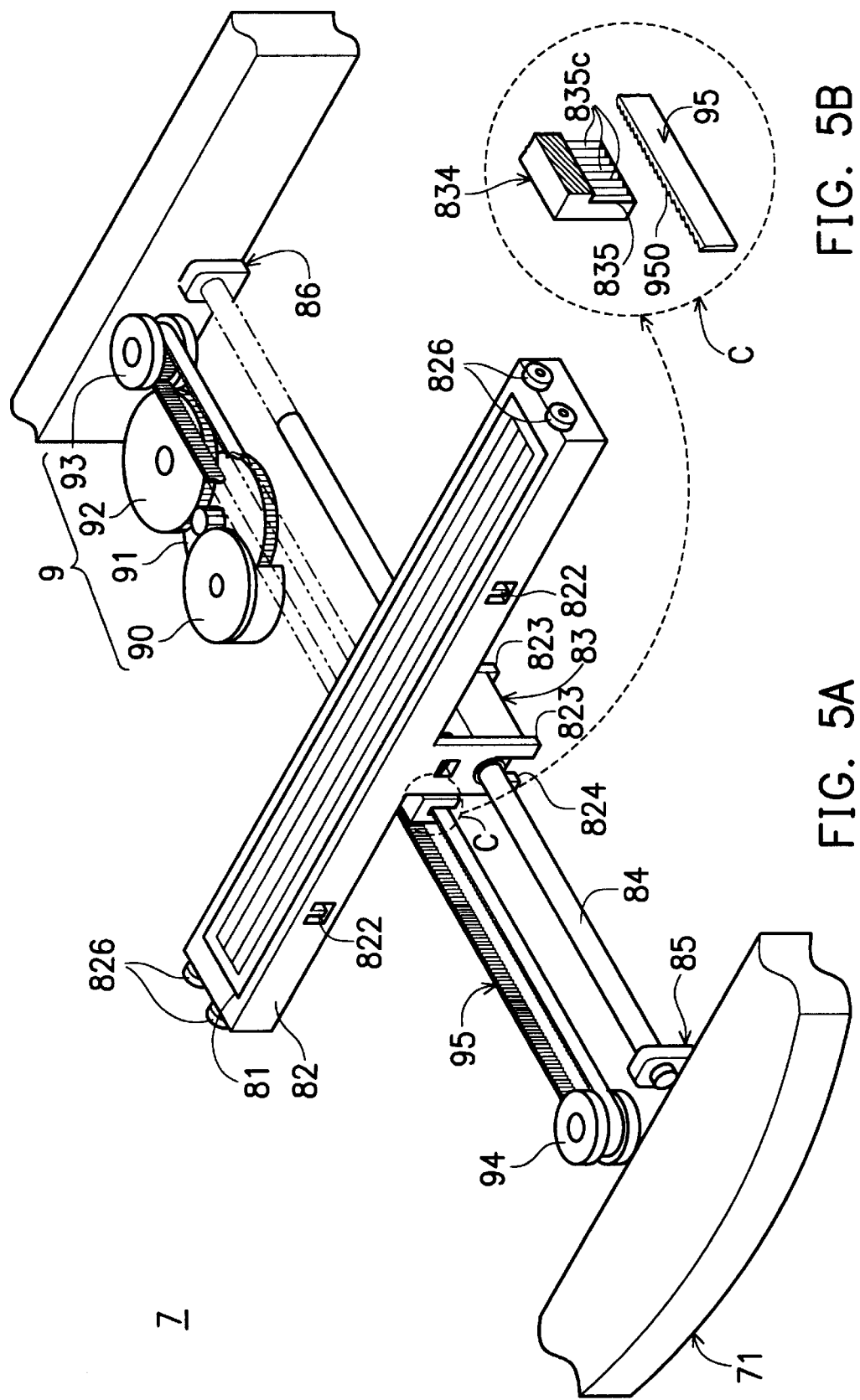
FIG. 5A is a perspective view of an assembled receiving and moving device of FIG. 4.
FIG. 5B is an enlarged sectional view showing the engaging portion of the connecting member.

Turning to FIG. 5A, this drawing shows the cartridged shaped contact image sensor 81 received in the holder 82, the connecting member 83 is slidably mounted on the guiding rod 84 and connected to the two protruded plates 823, 823 of the holder 82, and the engaging portion 834 is engaged with the toothed belt 95. FIG. 5b is an enlarged view showing the relationship of the toothed inner wall 835C and the toothed belt 95. As the driving force for driving the holder 82 to slide along the longitudinal axis of the lower frame 71 does not directly act on the holder 82 but on the connecting member 83 through the toothed inner wall 835C thereof and the holder 82 is guided by the guiding bar 84 which is orthogonal to the holder 82, even at the start of the driving, the holder 82 can move along the longitudinal direction of the lower frame 71 smoothly without inclination.

Figures 6A, 6B:
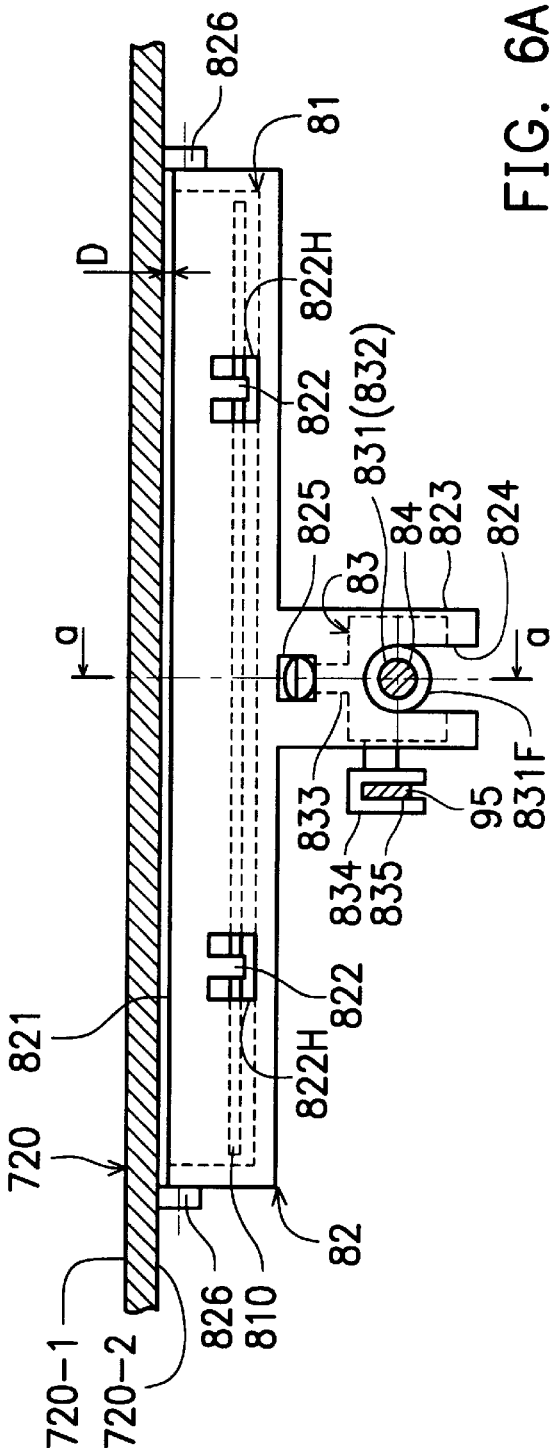
FIG. 6A is a partial sectional view showing the holder of FIG. 4 along the longitudinal axis thereof.
FIG. 6B is a partial sectional view along the line a—a of FIG. 6A.

FIG. 6A depicts the side view of the holder 82 in which the contact image sensor 81 is received. FIG. 6B is a sectional view along the a—a line of FIG. 6A.

Referring to FIG. 6B, two coil springs 836 are received and biased between the connecting member 83 and the holder 82. The two ends of each coil spring 836 are respectively mounted on the post 837 and the post 827 so that the holder 82 is urged upwardly without directly contacting the metal coil springs 836. Also as can be seen from FIG. 6B, the two engaging elements 822, 822 are protruded in the corresponding grooves 810, 810. And thus the contact image sensor 81 can be firmly received in the holder 82 without inclination, and the distance between the top surface of the contact image sensor 81 and the glass plate 720 can be maintained as a constant, D, due to the rollers 826, 826 disposed therebetween.

Figure 7:
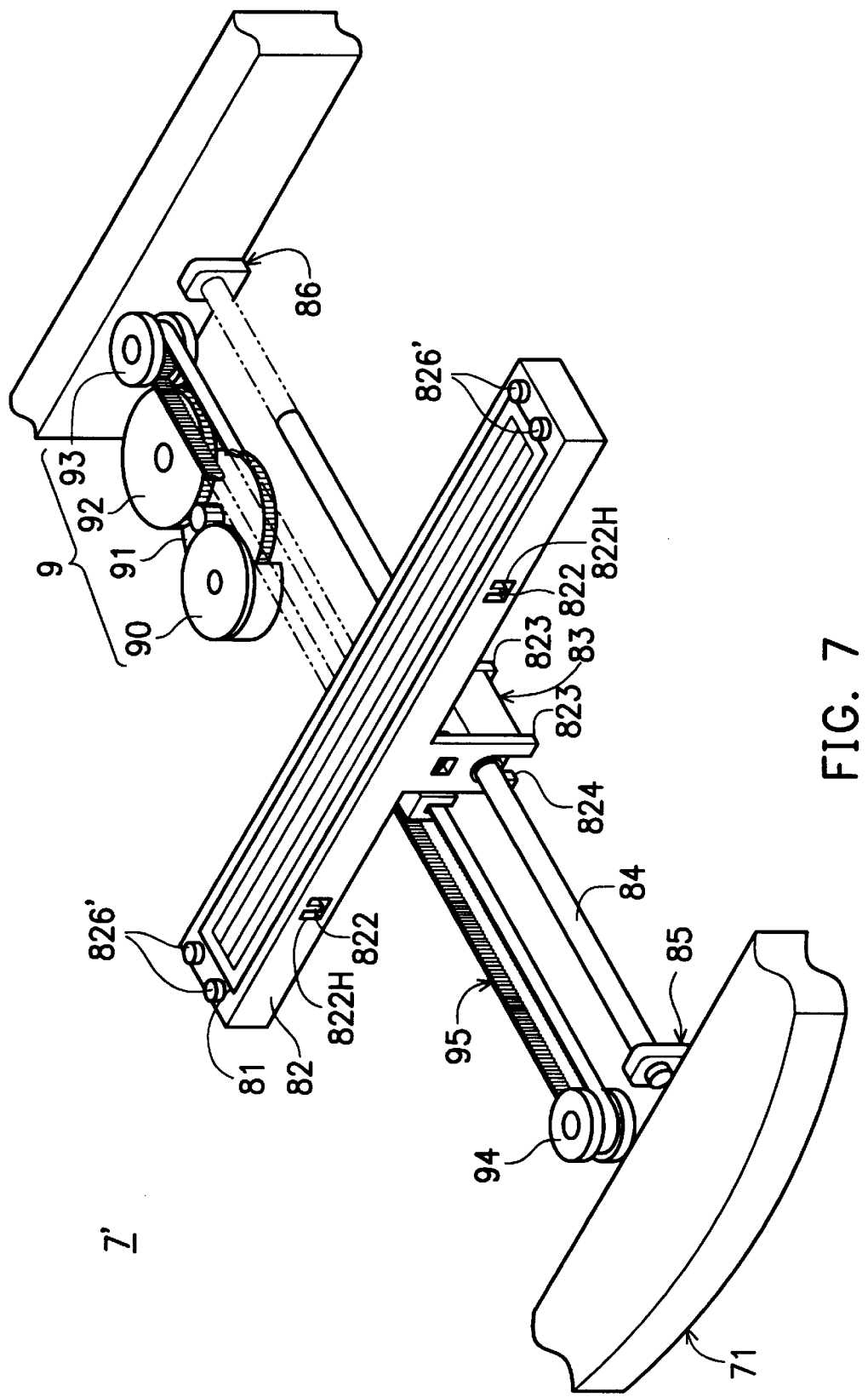
FIG. 7 is a perspective view of a receiving and moving device of a contact image sensor of a second embodiment of the invention.

Referring to FIG. 7, this embodiment is substantially the same as that shown in FIG. 5 except that at the top surface near to the two ends of the holder 82, two abrasion-resistant blocks 826', 826' are used instead of rollers 826, 826. The two abrasion-resistant blocks 826', 826' have the same function as the rollers 826, 826. When the holder 82 slides along the longitudinal axis of the lower frame 71 under the glass plate 720, the two abrasion-resistant blocks 826', 826' make the distance between the top surface of the contact image sensor 81 and the glass plate 720 be maintained as a constant, D.

What is claimed is:

1. A device for holding and moving an elongate contact image sensor along the two long sides of a substantially rectangular lower frame on which a substantially rectangular upper frame is mounted, the upper frame having a transparent plate disposed thereon, the device comprising:

(a) an elongate holder slidably mounted in the lower frame and being disposed in parallel to the two short sides of the lower frame, having an elongate recessed portion formed along the longitudinal axis thereof for receiving the elongate contact image sensor which is used to pick up the image of a detection object placed on the transparent plate, said elongate holder having a pair of downwardly protruded opposite plates disposed near the center thereof, each of said two protruded plates having a hole and a cut;

(b) a rod-like guiding member having two ends respectively mounted on the center of the two short sides of the lower frame, disposed orthogonal to the rod-like holder;

(c) a connecting member slidably mounted on the guiding member and detachably connected to the elongate holder near the center thereof, said connecting member having two upwardly protruded engaging members for detachably engaging with the two holes respectively of the downwardly protruded plates, and two laterally protruded ring-shaped flanges for being received in the two cuts respectively when the upwardly protruded engaging members are engaged with the downwardly protruded plates respectively;

(d) means for biasing said elongate holder upwardly, disposed between the connecting member and said elongate holder; and (e) means for driving said elongate holder to move in a direction parallel to the two long sides of said lower frame, being disposed on said lower frame.

2. The device as claimed in claim 1, wherein said elongate holder includes a roller disposed on the two ends thereof for being situated on the two long sides of the lower frame.

3. The device as claimed in claim 1, wherein said elongate holder includes an abrasion-resistant block deposed on the two ends thereof.

4. The device as claimed in claim 1, wherein the connecting member is made of plastics.

5. The device as claimed in claim 1, wherein said biasing means is a spring disposed between the connecting member and the elongate holder.

6. The device as claimed in claim 1, wherein said driving means includes a motor fixedly mounted on said lower frame, a transmission gear driven by said motor, a first drive pulley coupled to said transmission gear, being disposed near to one of the short sides of the lower frame, a second drive pulley disposed near to the other short side of the lower frame, and a toothed belt wrapped round the first pulley and the second pulley; and said connecting member includes a laterally disposed engaging portion having a toothed surface for engaging with said toothed belt whereby when the first drive pulley is driven the rod-like holder is moved along the longitudinal direction of the lower frame.

7. The device as claimed in claim 1, wherein the contact image sensor has a groove formed at the two sides thereof, the holder has a protruded engaging element formed at the side wall thereof for engaging in said groove.

8. A scanner comprising:

(a) a substantially rectangular lower frame having two long sides and two short sides;

(b) a substantially rectangular upper frame mounted on said lower frame, having a transparent plate disposed thereon;

(c) an elongate holder slidably mounted in the lower frame and being disposed in parallel to the two short sides of the lower frame, having an elongate recessed portion formed along the longitudinal axis thereof, said elongate holder having a pair of protruded opposite plates which are extended downwardly from the two sides thereof and disposed at the center, each of said two protruded plates having a hole and a cut, said connecting member including two upwardly protruded engaging members for being detachably engaged with the two holes respectively of the downwardly protruded plates and two laterally protruded ring-shaped flanges for being received in the two cuts respectively when the upwardly protruded engaging members are engaged with the downwardly protruded plates respectively;

(d) an elongate contact image sensor received in the elongate recessed portion to pick up the image of a detection object placed on the transparent plate;

(e) a rod-like guiding member having two ends respectively mounted on the center of the two short sides of the lower frame, disposed orthogonal to said elongate holder;

(f) a connecting member slidably mounted on the guiding member and detachably connected to the elongate holder near the center thereof;

(g) means for biasing said elongate holder upwardly, disposed between the connecting member and the elongate holder; and (h) means for driving said longitudinal holder to move in a direction parallel to the two long sides of said lower frame, being disposed on said lower frame.

9. The scanner as claimed in claim 8, wherein said elongate holder includes two rollers disposed on the two ends thereof for being situated on the two long sides of the lower frame.

10. The scanner as claimed in claim 8, wherein said elongate holder includes two abrasion-resistant blocks disposed on the two ends thereof.

11. The scanner as claimed in claim 8, wherein the connecting member is made of plastics.

12. The scanner as claimed in claim 8, wherein said biasing means is a spring disposed between the connecting member and the elongate holder.

13. The scanner as claimed in claim 8, wherein said driving means includes a motor fixedly mounted on said lower frame, a transmission gear driven by said motor, a first drive pulley coupled to said transmission gear, being disposed near one of the short sides of the lower frame, a second drive pulley disposed near the other short side of the lower frame, and a toothed belt wrapped round the first pulley and the second pulley; and said connecting member includes a laterally disposed engaging portion having a toothed surface for engaging with said toothed belt whereby when the first drive pulley is driven so that the elongate holder moves along the longitudinal direction of the lower frame.

14. The scanner as claimed in claim 8, wherein the contact image sensor has a groove formed at the two sides thereof, the holder has a protruded engaging element formed at the side wall thereof for engaging in said groove.

* * * * *